Oct. 6, 1970  C. J. MARSHALL  3,532,386
WHEEL COVER
Filed March 18, 1969
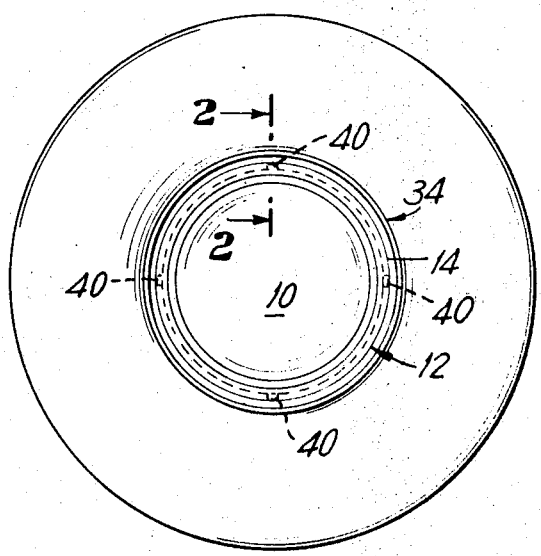
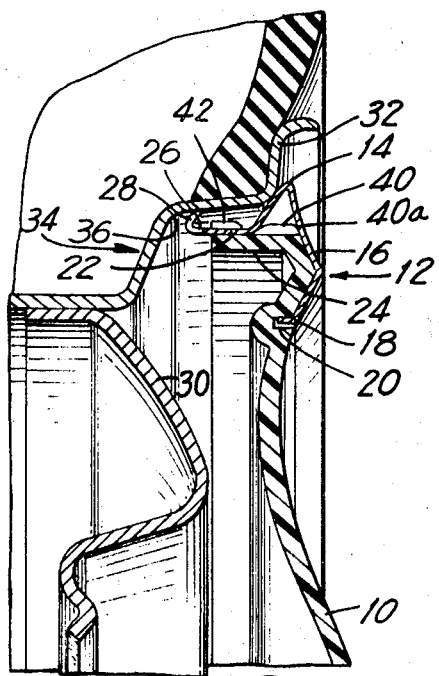
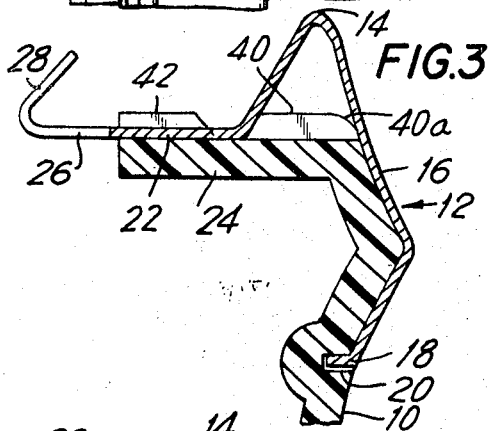
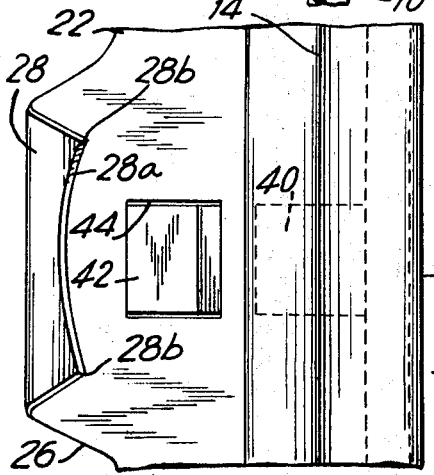
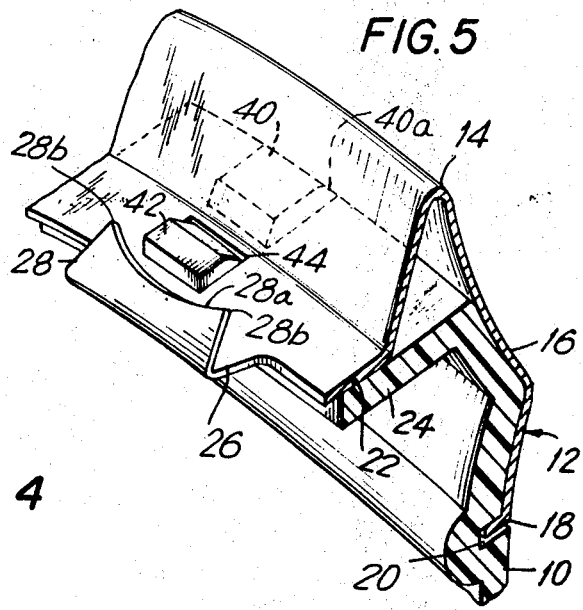
INVENTOR.
CLAUDE J. MARSHALL United States Patent Office 3,532,386
Patented Oct. 6, 1970

3,532,386
WHEEL COVER
Claude J. Marshall, Ann Arbor, Mich., assignor to North American Rockwell Corporation, Pittsburgh, Pa., a corporation of Delaware
Filed Mar. 18, 1969, Ser. No. 808,280
Int. Cl. B60b 7/04
U.S. Cl. 301—37                9 Claims

ABSTRACT OF THE DISCLOSURE

A two-piece automotive wheel cover including a central circular decorative member and a metal mounting ring surrounding the periphery of the decorative member with radially outwardly projecting locking bosses spaced around the periphery of said decorative member and engaged in a recess within a turned edge of said mounting ring to lock the assembly together, with said mounting ring having axially extending spring engaging fingers bent to provide radially outwardly projecting terminal portions with sharp edges for resiliently engaging a generally cylindrical flange on the rim of the wheel and biting into the surface thereof to secure the wheel cover on the wheel and to maintain the decorative member and the mounting ring in snug non-rattling relationship.

---

This invention relates to a low cost automotive wheel cover having a central decorative portion and a peripheral metal mounting ring having spring retaining fingers engaging the rim of the wheel.

As is well known to those familiar with the art, the retention of a wheel cover on an automotive wheel involves substantial problems due to the shocks and strains which are encountered in normal driving and which tend to dislodge the wheel cover from the wheel. It is obvious, for example, that when the wheel strikes an obstruction in the road, or passes over a curbing or a hole in the road, the abrupt deceleration of the wheel and the inertia of the wheel cover tends to cause the latter to separate from the wheel. Less apparent is the fact that even in straight-line driving along a smooth road, a portion of the weight of the automobile is imposed against the bottom of each wheel, causing a slight flattening of that side of the wheel, imperceptible to the eye but of significant magnitude, and as the wheel rotates, the position of this flattened portion is continually moving around the circumference of the wheel. This flattening effect is aggravated when the wheel strikes an obstruction or even when the automobile turns a corner so that the weight is concentrated on the two outside wheels. Even more significantly, the transverse forces imposed on the tread of the tire, due to the inertia and the centrifugal force of the car as it turns, are transmitted through the tire to the rim of the wheel, twisting the wheel out of planar alignment. The wheel is subjected to still other complex stresses when the brakes are applied, and so on.

Providing a wheel cover having retention means capable of holding the wheel cover on the wheel against such shocks and distortions of the wheel obviously involves substantial problems.

Moreover, it is very important that the retention means not only present accidental outward movement of the wheel cover but also prevent rotation of the wheel cover relative to the wheel, not merely to prevent twisting or breakage of the valve stem or valve stem extension which projects through a hole in the wheel cover, but also because relative rotation of the wheel cover will almost inevitably cause the wheel cover gradually to work its way off of the wheel.

Since it is often necessary to change a tire in an area remote from a service station and under adverse conditions such as darkness, rain, cold and so on, it is important that the wheel cover be capable of being easily and properly applied by persons who are unskilled and inexperienced and have no instructions and no special tools or equipment. Since automotive prices are highly competitive, it is also important that all of the aforementioned characteristics be achieved in a wheel cover which is simple and economical in construction. And, since styling is an extremely important factor in the selection of automobiles, it is also imperative that the wheel covers present an attractive appearance.

The present invention provides an extremely low-cost wheel cover which satisfies all of the aforementioned desirable objectives. The low cost is accomplished principally by making the wheel cover in two pieces: a central, decorative member preferably of molded synthetic resin, and an outer metal mounting ring which is attached to the periphery of the decorative member and which includes spring retaining fingers engageable with a generally axially extending generally cylindrical flange on the rim of the wheel. The construction of these two components is such that they may be permanently joined in a firm, rattle-free assembly by merely pressing them together.

In the drawing:

FIG. 1 is a front elevational view of an illustrative wheel cover embodying features of the present invention, shown mounted on an automotive wheel.

FIG. 2 is a fragmentary cross section, at enlarged scale, taken on the line 2—2 of FIG. 1.

FIG. 3 is an enlargement of the portion of FIG. 2 which includes the upper edge of the central decorative member and the mounting ring thereon.

FIG. 4 is a fragmentary plan view of the wheel cover of FIGS. 1-3.

FIG. 5 is a fragmentary perspective view of the portion of the mounting ring shown in FIGS. 3 and 4.

As may be seen particularly in FIGS. 1 and 2, the illustrative wheel cover includes a central, circular decorative member 10 molded of a synthetic resin, for example a thermoplastic resin such as polyvinyl chloride, acrylonitrile-butadiene-styrene, polypropylene or polystyrene, although thermosetting resins, such as phenol formaldehyde, may also be used. The particular contour of the decorative surface of the member 10 which is shown is, of course, for purposes of illustration only and the design is subject to almost infinite variation.

Secured to the periphery of the decorative member 10 is a mounting ring 12 preferably formed of a strip of metal, for example, stainless steel, stamped and die rolled to the proper cross-sectional shape, and to circular form, cut to a length corresponding to the circumference of the decorative member 10, with its ends butted and welded or riveted together to form a ring.

As best shown in FIGS. 3 and 5, the mounting ring 12 is shaped to include a peripheral turned margin 14 with a skirt portion 16 extending generally radially inwardly from the front side thereof, and overlying and abutting the front surface of the decorative member in an annular marginal area thereof. Preferably but not necessarily the inner edge of the skirt portion 16 is bent to form a narrow generally cylindrical lip 18 which extends generally axially rearwardly into a circular groove 20 in the front surface of the decorative member 10 to conceal the sheared inner edge of the mounting ring and enhance the appearance of the wheel cover.

Projecting generally axially rearwardly from the rear side of the turned margin 14 is a generally cylindrical flange 22 which extends completely around the mounting ring 12 and is radially inset from the margin 14 so as to be concealed behind it. This flange 22 overlies and preferably abuts a generally cylindrical flange 24 which projects generally axially rearwardly from the periphery of the decorative member 10.

Projecting generally axially rearwardly from the rear edge of the flange 22 at spaced positions around the periphery of the mounting ring 12 are a plurality of integral spring retaining fingers 26 which are bent at their outer ends to provide relatively short and stiff terminal portions 28 which extend generally radially outwardly and slightly forwardly. The outer edges 28a of these terminal portions 28 lie substantially along a common circle of such diameter that, as the wheel cover is pressed inwardly onto an automobile wheel, such as is illustrated at 30, the sloping rear surfaces of the terminal portions 28 will engage the curved juncture between a generally radially extending annular surface 32 of the rim 34 of the wheel and an adjacent generally axially extending, generally cylindrical flange 36 of the rim, camming the spring fingers 26 resiliently inwardly and the flanges 22 and 24 into snug abutting contact. When the wheel cover is fully seated on the wheel, as shown in FIG. 2, the inner side of the turned margin 14 abuts the annular surface 32 of the rim 34, while the resilience of the spring fingers 26, reinforced by the structural rigidity of the abutting continuous cylindrical flanges 22 and 24, maintains the edges 28a of the terminal portions 28 in high pressure engagement with the flange 36. The pressure existing between the flanges 22 and 24 also helps prevent rattling of the wheel cover when it is mounted on the wheel.

As shown in FIGS. 4 and 5, the outer edge 28a of each of the terminal portions 28 is shaped, for example with an arcuate indentation intersecting the side edges of the terminal portions, to form sharp projecting spurs or cusps 28b which bite into the surface of the flange 36 to enhance the frictional engagement between the wheel cover and the rim and strongly resist accidental removal of the wheel cover as well as rotation of the wheel cover relative to the wheel.

As best shown in FIG. 3, the mounting ring 12 is secured to the decorative member 10 by means of a plurality (for example, four) of locking bosses 40 projecting generally radially outwardly from the flange 24 of the decorative member 10 at equally spaced positions around the periphery thereof and into the internal recess of the turned margin 14 of the mounting ring 12. The angular positions of these locking bosses 40 coincide with those of certain of the spring retaining fingers 26 to facilitate assembly of the mounting ring 12 and the decorative member 10 by merely pressing the mounting ring rearwardly relative to the decorative member. During such relative movement, the curved junctures of the terminal portions 28 and the spring fingers 26 engage the sloping front edges 40a of the bosses 40, camming spring fingers 26 outwardly and/or the bosses 40 inwardly, so that the flange 22 of the mounting ring and/or the periphery of the decorative member 10 are resiliently distorted to non-circular form, until the bosses 40 come into alignment with the internal recess of the turned margin 14, allowing the parts to snap back to their normal circular form, with the locking bosses tightly engaged in the recess of the turned margin, locking the parts together so that the two-piece wheel cover can be mounted on and removed from the wheel as an integral member. In addition, the tight engagement between the locking bosses and the recess of the turned margin assures proper axial alignment of the parts of the wheel cover and, in conjunction with the resilient pressure existing between the flanges 22 and 24 when the cover is mounted on the wheel, prevents rattling of the parts during use. The relative dimensions of the flanges 22 and 24, the bosses 40, and the recess of the turned margin are selected such that the parts are maintained in firm, rattle-free relation under all normal operating conditions, including extremes in thermal expansion and contraction between the parts and the wheel.

To prevent rotation of the decorative member 10 relative to the mounting ring 12, the flange 24 of the decorative member is provided with at least one generally radially outwardly projecting anti-turn boss 42 which, as shown in FIGS. 4 and 5, is received in a hole 44 in the flange 22 of the mounting ring. The angular position of the anti-turn boss 42 is preferably aligned with that of one of the locking bosses 40, so that the distortion of the flange 22 of the mounting ring and/or the periphery of the decorative member 10 to non-circular form during assembly of the two parts of the wheel cover, as above described, will cause the flange 22 to pass freely over the anti-turn boss 42 until the two parts reach their fully assembled positions, and snap back to circular shape, whereupon the anti-turn boss 42 will project through the hole 44, locking the parts against relative rotation.

I claim:

1. A wheel cover for a multi-flanged drop center automotive wheel, comprising a circular decorative member, a metal mounting ring extending around the periphery of said decorative member, said mounting ring having a peripheral turned margin surrounding the peripheral edge of said decorative member, a skirt portion extending generally radially inwardly from the front side of said turned margin and overlying and abutting the front surface of said decorative member in an annular marginal area thereof and a generally cylindrical flange extending generally axially and rearwardly from said turned margin and being radially inset from said turned margin so as to be concealed behind said turned margin, a plurality of locking bosses projecting radially outwardly from said peripheral edge at spaced positions therearound into the internal recess of said turned margin, whereby said mounting ring can be assembled with said decorative member by pressing said mounting ring rearwardly onto said decorative member, elastically distorting at least one of such parts until said locking bosses snap into said recess, at least one anti-turn element on said decorative member engaging cooperative means on said locking ring to prevent relative rotation of such parts, said flange having projecting generally axially rearwardly therefrom a plurality of spring retaining fingers bent to provide relatively short and stiff terminal portions extending generally radially outwardly and slightly forwardly therefrom, said terminal portions having outer sharp edges lying substantially along a circle of such diameter that as said wheel cover is pressed onto said wheel to the point where said turned margin abuts a generally radially extending annular surface of the rim of said wheel, said retaining fingers will be cammed resiliently inwardly to maintain said sharp edges in firm, biting engagement with an adjoining generally cylindrical flange on said rim to secure said wheel cover against accidental removal from and rotation relative to said wheel.

2. A wheel cover is described in claim 1 in which said sharp edges are provided with one or more arcuate indentations forming sharp projecting spurs which bite into the flange of said rim.

3. A wheel cover as described in claim 1 in which said decorative member is formed of molded plastic.

4. A wheel cover as described in claim 3 in which the inner edge of said skirt portion is bent rearwardly to form a short, generally cylindrical and axially rearwardly extending lip which is received in a generally circular groove in the outer surface of said decorative member to conceal the edge of said lip.

5. A wheel cover as described in claim 1 in which said fingers are aligned with said bosses, whereby during assembly of said mounting ring and said decorative member the curvature of the juncture of said terminal portions with said fingers engages the front edges of said bosses to cam said fingers radially outward relative to said bosses.

6. A wheel cover as described in claim 5 in which the front edges of said bosses are bevelled to facilitate such camming action.

7. A wheel cover as described in claim 1 in which said decorative member is provided with an integral flange extending generally axially rearwardly beneath the flange on said mounting ring for resilient abutment therewith when the wheel cover is pressed into said wheel to prevent rattling therebetween.

8. A wheel cover as described in claim 6 in which said anti-turn element comprises a boss projecting radially outwardly from the outer surface of the flange on said decorative member through a hole in the flange on said mounting ring.

9. A wheel cover for a multi-flanged drop center automotive wheel, comprising a circular decorative member of molded plastic having an integral generally cylindrical flange extending generally axially rearwardly around the periphery thereof, a rolled metal mounting ring extending around the periphery of said decorative member, said mounting ring having a peripheral turned margin, a skirt portion extending generally radially inwardly from the front sides of said turned margin and overlying and abutting the front surface of said decorative member in an annular marginal area thereof and a generally cylindrical, generally axially extending flange overlying and substantially abutting the flange on said decorative member, a plurality of locking bosses projecting radially outwardly from the flange on said decorative member at widely spaced positions therearound into the internal recess of said turned margin, whereby said mounting ring can be assembled with said decorative member by pressing said mounting ring rearwardly onto said decorative member, elastically distorting at least one of such parts, until said locking bosses snap into said recess, at least one anti-turn boss projecting radially outwardly from the flange on said decorative member in axial alignment with one of said locking bosses into a hole in the flange on said mounting ring, the flange on said mounting ring having projecting generally axially rearwardly therefrom at angular positions with said locking bosses a plurality of spring retaining fingers bent to provide relatively short and stiff terminal portions extending generally radially outwardly and slightly forwardly therefrom, said terminal portions having outer sharp edges lying substantially along a circle of such diameter that as said wheel cover is pressed onto said wheel to the point where said turned margin abuts a generally radially extending annular surface of the rim of said wheel, said retaining fingers will be cammed resiliently inward to maintain said sharp edges in firm, biting engagement with an adjoining generally cylindrical flange on said rim to secure said wheel cover against accidental removal from and rotation relative to said wheel and to urge the flanges of said mounting ring and said decorative member into resilient abutting engagement so as to prevent rattling therebetween.

References Cited

UNITED STATES PATENTS

| 2,493,001 | 1/1950 | Lyon | 301—37 |
| 2,842,405 | 7/1958 | Lyon | 301—37 |
| 3,019,055 | 1/1962 | Lyon | 301—37 |
| 3,252,739 | 5/1966 | Huntley | 301—37 |
| 3,265,441 | 8/1966 | Baldwin | 301—37 |
| 3,416,840 | 12/1968 | Gibbings | 301—37 |

FOREIGN PATENTS 494,765  7/1953  Canada.

RICHARD J. JOHNSON, Primary Examiner